United States Patent [19]

Grelat

[11] 4,384,119
[45] May 17, 1983

[54] CATALYTICALLY REDUCTIVE RING CLOSURE FOR 1-ACYLAMINO-3,4-PHTHALOYLACRIDONES

[75] Inventor: Maurice Grelat, Bettingen, Switzerland

[73] Assignee: Ciba-Geigy Corporation, Ardsley, N.Y.

[21] Appl. No.: 340,671

[22] Filed: Jan. 19, 1982

[30] Foreign Application Priority Data

Jan. 30, 1981 [CH] Switzerland ............................ 617/81

[51] Int. Cl.$^3$ ............................................. C09B 15/00
[52] U.S. Cl. .................................. 546/59; 106/288 Q; 260/377
[58] Field of Search ............................. 546/58, 59, 49; 260/377

[56] References Cited

U.S. PATENT DOCUMENTS 4,258,190  3/1981  Taggi ................................. 546/103

FOREIGN PATENT DOCUMENTS 369535   7/1963  Switzerland ........................ 260/377
1157018  7/1969  United Kingdom ................. 546/59

Primary Examiner—Donald G. Daus
Assistant Examiner—William A. Teoli, Jr.
Attorney, Agent, or Firm—Edward McC. Roberts

[57] ABSTRACT

The present invention relates to an advantageous novel process for producing 1-acylamino-3,4-phthaloylacridones by a hydrogenating ring-closure reaction of 1-acylamino-4-anilidoanthraquinone-2'-carboxylic acid esters.

The ring-closure reaction according to the invention to the acridone ring is performed under mild conditions, with regard to temperature and alkalinity of the reaction medium, with the use of a hydrogenating catalyst. The first step to effect the ester formation can be carried out, as a single-vessel reaction, with the use of a polar solvent as the reaction medium, and of an alkylphosphoric acid dialkyl ester as the esterifying agent.

11 Claims, No Drawings

CATALYTICALLY REDUCTIVE RING CLOSURE FOR 1-ACYLAMINO-3,4-PHTHALOYLACRIDONES

The invention relates to an advantageous novel process for producing 1-acylamino-3,4-phthaloylacridones by a hydrogenating ring-closure reaction of 1-acylamino-4-anilidoanthraquinone-2'-carboxylic acid esters, and to the production of these esters.

The ring-closure reaction according to the invention to the acridone ring is performed under mild conditions with regard to temperature and alkalinity of the reaction medium, the reaction scheme being as follows:

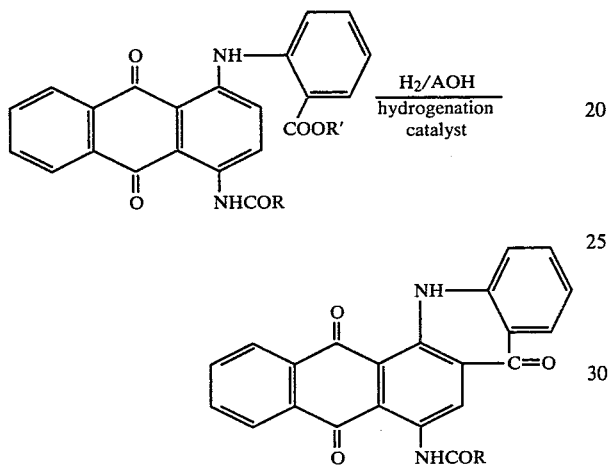

wherein A is alkali metal, R' is $C_1$–$C_4$-alkyl, and R is phenyl, alkylphenyl or $C_1$–$C_8$-alkyl.

The processes known hitherto, for example German Patent Specification No. 246,966, entail ring closure by means of zinc dust or hydrosulfite as the reducing agent and a strongly basic reaction medium. And for the producing of esters according to G.B. Patent Specification No. 421,591 there is also required a relatively high reaction temperature of between 150° and 250° C. Under these conditions, however, partial saponification of the ester occurs, and with the formed carboxylic acid there is no ring closure, so that consequently the yield of acridone is only about 65 to 75% of the theoretical amount.

In Houben-Weyl, Methoden der Organischen Chemie (Methods in Organic Chemistry), col. 7/3c (1979), p. 276, pt. 2, is moreover described how it is possible even with the use of not very active nickel catalysts to reduce anthraquinones to anthrones.

It was therefore to be expected that with active hydrogenation catalysts, for example Raney nickel, 1-acylamino-4-anilidoanthraquinone-2'-carboxylic acid esters would be converted into the corresponding anthrones, or even into further-reduced products.

It was the object of the present invention to provide an improved method of synthesis of 1-acylamino-3,4-phthaloylacridones. This has been achieved by the development of the process according to the invention. It has been found that, surprisingly, the very active nickel and palladium catalysts are particularly well suited for the hydrogenating ring-closure reaction, and that no anthrones are formed, with the result that the yield of acridones is 90% or even higher. A further advantage of the process according to the invention is the esterification with alkylphosphoric acid dialkyl esters, since this method of esterification saves a reaction step. Normally, the carboxylic acid group has to be firstly converted into the acid chloride, for example by means of phosphorus pentachloride or thionyl chloride, and subsequently converted by means of alkali alcoholates into the ester.

The present invention thus relates to a novel process for producing 1-acylamino-3,4-phthaloylacridones by reaction of 1-acylamino-4-bromoanthraquinone with anthranilic acid to 1-acylamino-4-anilidoanthraquinone-2'-carboxylic acid, esterification of the acid and subsequent reductive ring-closure reaction, which process comprises effecting esterification by means of an alkylphosphoric acid dialkyl ester, the alkyl groups each having 1 to 4 C atoms, and performing the reductive ring-closure reaction of 1-acylamino-4-anilido-2'-carboxylic acid ester of the formula

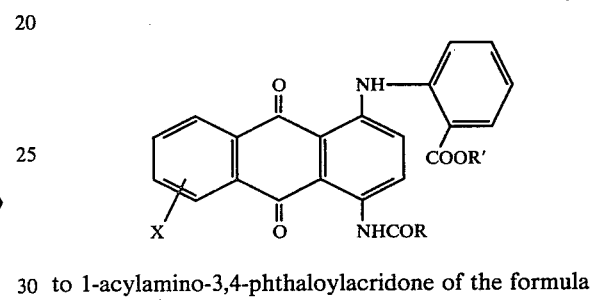

to 1-acylamino-3,4-phthaloylacridone of the formula wherein R is phenyl, alkylphenyl or $C_1$–$C_8$ alkyl, R' is $C_1$–$C_4$-alkyl, and X is hydrogen, halogen or $C_1$–$C_4$-alkyl, by means of a hydrogenation catalyst and hydrogen in a basic reaction medium.

According to the present invention, R is for example: ethyl, propyl or isoamyl, in particular however it is phenyl or methyl, X is halogen, such as chlorine or bromine, or alkyl, such as methyl or ethyl; X is however especially hydrogen. The hydrogenation catalysts used are the usual substances, for example platinum/charcoal, but particularly Raney nickel, and palladium on charcoal.

The whole reaction can be divided into two stages, the first stage being the production of the 1-acylamino-4-anilidoanthraquinone-2'-carboxylic acid ester, and the second stage the ring-closure reaction to acridone.

With the use of polar solvents, such as nitrobenzene or aliphatic alcohols, as the reaction medium, the individual steps for producing the stated ester can be carried out as a so-called single-vessel reaction, that is to say, the intermediate steps of the reaction are not specially isolated, processing being continued in the same reaction medium.

A particular feature of the second step of the overall reaction, that is, the reductive acridone ring closure, is, besides the use of active catalysts having a large surface area, the use of not too large an amount of alkali. There are preferably used 2 to 4 mols of alkali, in particular 2.2 to 3 mols of alkali, per mol of anthraquinone compound. The alkali compound used is for example ammonia or LiOH, especially however KOH, and in particular NaOH.

Advantageous in this second step is also the use of buffers of the customary type, for example sodium acetate, preferably in an amount of 1 to 10 percent by weight, relative to the ester, and the use of solubility-promoting agents or surface-activating agents. These are in this case for example lower alcohols and ether alcohols, and above all pyridine and pyridine derivatives. They are employed preferably in an amount of 30 to 100 percent by weight, relative to the ester, and they bring about a reduction of the reaction time. The reaction temperature in the case of esterification is 100° to 150° C., and the ring-closure reaction is performed advantageously at about room temperature, the adiabatic temperature rise not being so great that there is any special need for cooling. The reaction temperature accordingly preferred is between 10° and 50° C., especially between 18° and 25° C.

The reactants are used in the reaction in stoichiometric proportions, or with only slight deviations therefrom. Only the alkylphosphoric acid dialkyl ester is used in excess of the amount needed for esterification of the carboxylic acid groups, the amount used being preferably 2 to 5 times the amount theoretically required.

It is possible, if desired, to obtain 1-amino-3,4-phthaloylacridone from the produced 1-acylamino-3,4-phthaoylacridone by saponification, for example by the use of approximately 90% sulfuric acid.

The compounds obtained by the novel process of the invention are vat dyes or dye intermediates for producing vat dyes.

The novel process can be performed for example as follows: 1-Acylamino-4-bromoanthraquinone, anthranilic acid, alkali metal hydroxide and copper(I) chloride, as a condensation catalyst, are placed into the reaction vessel with an amount of a polar solvent having a boiling point above 130° C. (for example nitrobenzene or amyl alcohol), the amount being sufficient to render the mixture readily stirrable. It is as a rule about double the amount by weight, relative to the total amount of reactants. The mixture is then heated at 100° to 130° C. for about 2 to 5 hours, in the course of which the water forming is continuously distilled off. Heating is afterwards maintained at 120° to 150° C. for 3 to 8 hours; the alkylphosphoric acid dialkyl ester is then added, and the mixture is heated at the same temperature, with stirring, for a further 3 to 8 hours. It is subsequently cooled to 70° to 100° C., and the bulk of unreacted phosphoric acid ester and a portion of the nitrobenzene are distilled off under vacuum. After cooling and filtration under suction, the suction-filter residue is washed with ethanol or is freed from residual solvent by means of steam distillation. The residue is washed neutral with water and optionally dried.

The 1-acylamino-4-anilidoanthraquinone-2-carboxylic acid methyl ester which has been obtained in stage I, together with a number of parts of buffer, 1 to 10 percent by weight of palladium (5%) on charcoal, or Raney nickel, relative to the ester, 2 to 4 mols of an approx. 0.5 N aqueous alkali hydroxide solution per mol of anthraquinone compound and 5 to 10% of pyridine, relative to the amount of alkali hydroxide solution, is placed into the reaction vessel, and hydrogen under a slight pressure is passed, with thorough stirring, through the mixture at room temperature. After the amount of hydrogen necessary for the ring closure reaction has been absorbed, the reaction mixture is filtered until clear, and the residue is washed portionwise with a so-called blank vat, consisting of about 10% alkali hydroxide solution and 1 to 5% of alkali dithionite, relative to the alkali hydroxide solution. The blank vat dissolves the product still present in the filtration residue.

The dissolved leuco-1-acylamino-3,4-phthaloylacridone now present in the filtrate is oxidised with air, and the precipitated product, 1-acylamino-3,4-phthaloylacridone, is filtered warm, washed neutral with water and dried. The acylamino group can if desired be saponified to the free amino group, for example with 90% $H_2SO_4$ at 100° C.

The procedure described above yields a product of high purity and in approximately 90% yield, relative to theory. When the ring-closure reaction is performed under a hydrogen pressure of up to 30 bar, the reaction can proceed considerably more rapidly.

The reaction duration is also dependent on the physical form of the starting product: finely ground starting material or that which has been dissolved and re-precipitated from a solvent, for example dimethylformamide reacts far more rapidly than does a coarse crystalline material.

Compared with the prior known processes mentioned at the commencement, the novel process of the present invention gives in particular higher product yields and, by virtue of the low alkali requirement, is ecologically favourable, since the alkali excess after the reaction has to be neutralised before being fed into the waste water. In the case of the otherwise customary use of hydrosulfite or zinc dust, there moreover occurs a high salt or heavymetal contamination of effluents.

The novel process is further illustrated by the Examples which follow. The term 'parts' denotes parts by weight.

EXAMPLE 1

Production of 1-benzoylamino-4-anilidoanthraquinone-2'-carboxylic acid methyl ester—step I 81.2 parts (0.2 mol) of 1-benzoylamino-4-bromoanthraquinone, 34.25 parts of anthranilic acid, 41.4 parts of potassium carbonate, 0.3 part of copper-I chloride and 240 parts of nitrobenzene are heated, with stirring, in a nitrogen atmosphere to 115° to 120° C., and after 2 hours a thick violet suspension has formed. A further 0.2 part of copper-I chloride is added to the reaction mixture, and stirring is continued for 2 hours at 115° to 120° C., in the course of which the formed water is continuously distilled off. The temperature is then raised to 135° to 140° C. and is held there for 5 hours; 240 parts of dimethylmethanephosphonate are subsequently added, the reaction mixture is stirred at 135° to 140° C. for a further 5 hours and is then cooled to 70° to 80° C. There are distilled off at this temperature in vacuo about 200 parts of a mixture of nitrobenzene and dimethylmethanephosphonate. The mixture is cooled to 20° C., filtration with suction is performed, and the residue is washed with 100 parts of ethyl alcohol. The residue is then distilled with steam until all the residual nitrobenzene has been removed; the resulting product is filtered off under suction, washed neutral with water and dried. The yield of 1-benzoylamino-4-anilidoanthraquinone-2'-carboxylic acid methyl ester is 91.3% of theory.

It is also possible to use, instead of nitrobenzene, also amyl alcohol as the solvent, in which case however about 800 to 900 parts of amyl alcohol are necessary to ensure that the reaction mixture remains easily stirrable.

Production of 1-benzoylamino-3,4-phthaloylacridone Ring-closure reaction—step II 23.8 parts (0.05 mol) of 1-benzoylamino-4-anilidoanthraquinone-2'-carboxylic acid methyl ester, 6 parts of sodium acetate, 1 part of palladium charcoal (5%), 250 parts of an aqueous sodium hydroxide solution (0.5 N) and 12.5 parts of pyridine are vigorously stirred at room temperature under hydrogen. The hydrogen is gradually absorbed and a violet-red solution forms. After about 1230 ml of hydrogen have been absorbed, the reaction mixture is filtered clear, and the residue is washed portionwise with about 200 parts of a blank vat at about 50° to 60° C., the vat consisting of about 180 parts of water, 15 parts of sodium hydroxide and 5 parts of sodium dithionite. The leuco-1-benzoylamino-3,4-phthaloylacridone dissolved in the filtrate is oxidised with air, and the 1-benzoylamino-3,4-phthaloylacridone which precipitates is filtered off warm, washed neutral with hot water and dried. The yield of pure product is about 90% of theory. If necessary, the benzoylamino group can be saponified, for example with 90% sulfuric acid at 100° C., to the free amino group.

EXAMPLE 2

Production of 1-acetylamino-3,4-phthaloylacridone 20.7 parts of 1-acetylamino-4-anilido-2'-carboxylic acid methyl ester (produced from 1-acetylamino-4-bromoanthraquinone according to Example 1, step I), 8 parts of sodium acetate, 2 parts of Raney nickel, 17.5 parts of pyridine and 350 parts of sodium hydroxide solution (0.5 N) are vigorously stirred at room temperature under hydrogen. After 1232 ml of hydrogen have been absorbed, the formed claret-coloured solution is filtered clear, and the residue is washed portionwise with about 200 parts of a blank vat (180 parts of water, 15 parts of sodium hydroxide and 5 parts of sodium dithionite). The dissolved leuco-1-acetylamino-3,4-phthaloylacridone is oxidised with air, and the precipitated 1-acetylamino-3,4-phthaloylacridone is filtered off and dried. The yield of pure product is 91.3% of theory.

This reaction can be performed also in a purely aqueous medium, that is to say, without pyridine. The reaction then however takes twice as long.

EXAMPLE 3

Production of 1-benzoylamino-3,4-phthaloylacridone 23.8 parts of 1-benzoylamino-4-anilidoanthraquinone-2'-carboxylic acid methyl ester, 1 part of palladium charcoal (5%), 250 parts of sodium hydroxide solution (0.5 N) and 30 parts of ethyl alcohol are hydrogenated at room temperature with vigorous stirring. After about 1230 ml of hydrogen have been absorbed, the reaction mixture is filtered clear, and the residue is washed portionwise with about 200 parts of a blank vat (180 parts of water, 15 parts of sodium hydroxide and 5 parts of sodium dithionite). The leuco-1-benzoylamino-3,4-phthaloylacridone dissolved in the filtrate is oxidised with air; the 1-benzoylamino-3,4-phthaloylacridone which precipitates is filtered warm, washed neutral with hot water and dried. The yield of pure product is 90.9% of theory.

EXAMPLE 4

When the procedure is carried out in the manner described in Example 1 except that there is used, in place of 1-benzoylamino-4-anilidoanthraquinone-2'-carboxylic acid methyl ester, an equivalent amount of 1-benzoylamino-4-anilidoanthraquinone-2-ethyl ester, there is obtained 1-benzoylamino-3,4-phthaloylacridone in a yield similar to that in Example 1. The ethyl ester can be produced according to Example 1 by using diethylethanephosphonate instead of dimethylmethanephosphonate. The esterification reaction however proceeds somewhat slower. An esterification temperature of about 150° to 155° C. is to be preferred in this case.

EXAMPLE 5

By using, instead of 1-benzoylamino-4-bromoanthraquinone, equivalent amounts of 1-benzoylamino-4-bromo-6-chloroanthraquinone and of 1-benzoylamino-4-bromo-7-chloro-anthraquinone, the procedure otherwise being as described in Example 1, there are obtained 1-benzoylamino-6-chloro-and -7-chloro-3,4-phthaloylacridone, respectively, in a similar yield.

EXAMPLE 6

When the procedure is carried out in the manner described in Example 1 except that there are used, instead of 1-benzoylamino-4-bromoanthraquinone, equivalent amounts of 1-propionylamino-4-bromoanthraquinone and 1-butyrylamino-4-bromoanthraquinone, there are obtained 1-propionylamino-3,4-phthaloylacridone and 1-butyrylamino-3,4-phthaloylacridone, respectively, in a similar yield.

What is claimed is:

1. A process for producing 1-acylamino-3,4-phthaloylacridones by reaction of 1-acylamino-4-bromoanthraquinone with anthranilic acid to 1-acylamino-4-anilidoanthraquinone-2'-carboxylic acid, esterification of the acid and subsequent reductive ring-closure reaction, which process comprises effecting esterification by means of an alkylphosphoric acid dialkyl ester, the alkyl groups each having 1 to 4 C atoms, and performing the reductive ring-closure reaction of 1-acylamino-4-anilido-2'-carboxylic acid ester of the formula

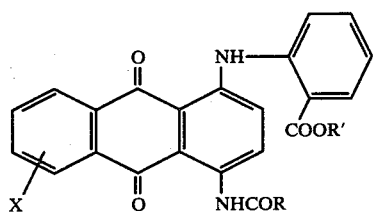

to 1-acylamino-3,4-phthaloylacridone of the formula

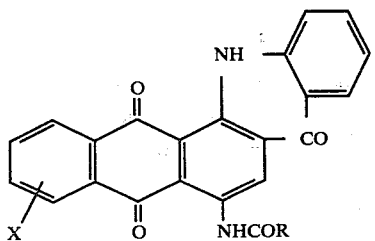

wherein R is phenyl, alkylphenyl or $C_1$-$C_8$-alkyl, R' is $C_1$-$C_4$-alkyl, and X is hydrogen, halogen or $C_1$-$C_4$-alkyl, by means of a hydrogenation catalyst and hydrogen in a basic reaction medium, said hydrogen being provided in amount just sufficient to accomplish ring closure.

2. A process according to claim 1, wherein the reaction of 1-acylamino-4-bromoanthraquinone to 1-acylamino-4-anilidoanthraquinone-2'-carboxylic acid methyl ester is performed, as a single-vessel reaction, in a polar solvent, with the use of dimethylmethanephosphonate as the esterifying agent, in a 1- to 5-fold molar excess relative to the amount required for esterification of the carboxylic acid, at a temperature of between 100° to 150° C.

3. A process according to claim 2, wherein the polar solvent used is amyl alcohol or nitrobenzene.

4. A process according to claim 1, wherein Raney nickel or palladium on charcoal is used as the hydrogenating catalyst.

5. A process according to claim 1, wherein the reductive ring-closure reaction of 1-acylamino-4-anilidoanthraquinone-2'-carboxylic acid ester to 1-acylamino-3,4-phthaloylacridone is performed with the addition of 2 to 4 mols, especially 2.2 to 3 mols, of alkali per mol of anthraquinone compound.

6. A process according to claim 5, wherein the alkali used is KOH or, in particular, NaOH.

7. A process according to claim 1, wherein there is used, during the ring-closure reaction, a buffer substance in an amount of 1 to 10 percent by weight, relative to the ester.

8. A process according to claim 1, wherein there is used, during the ring-closure reaction, 30 to 100 percent by weight, relative to the ester, of a solubility-promoting agent.

9. A process according to claim 8, wherein the solubility-promoting agent used is pyridine or a pyridine derivative.

10. A process according to claim 1, wherein the starting material used is 1-benzoylamino-4-bromoanthraquinone or 1-acetylamino-4-bromoanthraquinone.

11. A process according to claim 1, wherein a hydrogen pressure of 1 to 30 bars is applied.

* * * * *